(12) United States Patent
Wu et al.

(10) Patent No.: US 7,528,587 B2
(45) Date of Patent: May 5, 2009

(54) SWITCHED CONVERTER WITH VARIABLE PEAK CURRENT AND VARIABLE OFF-TIME CONTROL

(75) Inventors: Albert M. Wu, Colorado Springs, CO (US); Steven M. Pietkiewicz, Fremont, CA (US)

(73) Assignee: Linear Technology Corporation, Milpitas, CA (US)

( * ) Notice: Subject to any disclaimer, the term of this patent is extended or adjusted under 35 U.S.C. 154(b) by 28 days.

(21) Appl. No.: 11/316,993

(22) Filed: Dec. 27, 2005

(65) Prior Publication Data

US 2007/0145957 A1 Jun. 28, 2007

(51) Int. Cl.
*G05F 1/00* (2006.01)
(52) U.S. Cl. .................. 323/282; 323/283; 323/284
(58) Field of Classification Search ................. 323/222, 323/232, 271, 282–285, 290
See application file for complete search history.

(56) References Cited

U.S. PATENT DOCUMENTS

| | | | | |
|---|---|---|---|---|
| 5,278,490 A * | 1/1994 | Smedley | ..................... | 323/284 |
| 5,532,626 A * | 7/1996 | Khayat | ..................... | 327/53 |
| 5,612,610 A * | 3/1997 | Borghi et al. | ..................... | 323/222 |
| 5,631,810 A * | 5/1997 | Takano | ..................... | 363/21.05 |
| 5,905,369 A * | 5/1999 | Ishii et al. | ..................... | 323/272 |
| 5,982,160 A * | 11/1999 | Walters et al. | ..................... | 323/282 |
| 5,982,214 A * | 11/1999 | Kim | ..................... | 327/280 |
| 6,163,139 A * | 12/2000 | Symonds | ..................... | 323/222 |
| 6,166,527 A * | 12/2000 | Dwelley et al. | ..................... | 323/222 |
| 6,181,120 B1 * | 1/2001 | Hawkes et al. | ..................... | 323/282 |
| 6,239,584 B1 * | 5/2001 | Jang et al. | ..................... | 323/222 |
| 6,307,356 B1 * | 10/2001 | Dwelley | ..................... | 323/282 |
| 6,344,980 B1 * | 2/2002 | Hwang et al. | ..................... | 363/21.01 |
| 6,373,734 B1 * | 4/2002 | Martinelli | ..................... | 363/89 |
| 6,456,050 B1 * | 9/2002 | Agiman | ..................... | 323/282 |
| 6,476,589 B2 * | 11/2002 | Umminger et al. | ..................... | 323/282 |
| 6,580,258 B2 * | 6/2003 | Wilcox et al. | ..................... | 323/282 |
| 6,628,106 B1 * | 9/2003 | Batarseh et al. | ..................... | 323/222 |
| 6,774,611 B2 * | 8/2004 | Umminger et al. | ..................... | 323/282 |
| RE38,780 E * | 8/2005 | Hawkes et al. | ..................... | 323/282 |
| 2004/0004470 A1 * | 1/2004 | Yoshida et al. | ..................... | 323/284 |
| 2004/0135565 A1 * | 7/2004 | Douma et al. | ..................... | 323/283 |
| 2004/0263140 A1 * | 12/2004 | Adragna et al. | ..................... | 323/282 |
| 2005/0057238 A1 * | 3/2005 | Yoshida | ..................... | 323/282 |
| 2005/0184713 A1 * | 8/2005 | Xu et al. | ..................... | 323/282 |
| 2005/0184716 A1 * | 8/2005 | Brown | ..................... | 323/283 |
| 2006/0113975 A1 * | 6/2006 | Mednik et al. | ..................... | 323/282 |
| 2006/0176036 A1 * | 8/2006 | Flatness et al. | ..................... | 323/282 |

OTHER PUBLICATIONS

LT3463/LT3463A, "Dual Micropower DC/DC Converters with Schottky Diodes" Linear Technology Corporation 2003.
LT3464 "Micropower Boost Converter with Schottky and Output Disconnect in ThinSOT", Linear Technology Corporation 2003.

* cited by examiner

*Primary Examiner*—Akm E Ullah
*Assistant Examiner*—M'Baye Diao
(74) *Attorney, Agent, or Firm*—McDermott Will & Emery LLP (57) ABSTRACT

A converter coupled to a DC voltage input and connectable to a load, includes a signal responsive switch coupled between a first circuit point and a second circuit point. In lieu of burst mode operation during low load conditions, the peak switch current is varied directly with load condition and a switch deactivation interval is varied inversely with load condition. The switch deactivation level is within a maximum level to avoid audio frequency band interference, while maintaining high efficiency operation throughout the load range.

19 Claims, 8 Drawing Sheets

SWITCHED CONVERTER WITH VARIABLE PEAK CURRENT AND VARIABLE OFF-TIME CONTROL

TECHNICAL FIELD

The disclosure relates to switched voltage regulators, more particularly to the control of peak current and switch off-time in accordance with sensed load condition.

BACKGROUND

The use of switching regulators to control a DC output voltage at a level higher than, lower than, or the same as, an input voltage is well known. Typically, one or more switches are activated to supply current pulses via an inductor to charge an output capacitor. The output voltage level is maintained at a desired level by adjusting the on and off times of the switching pulses in accordance with output voltage and load conditions.

Figure 1:
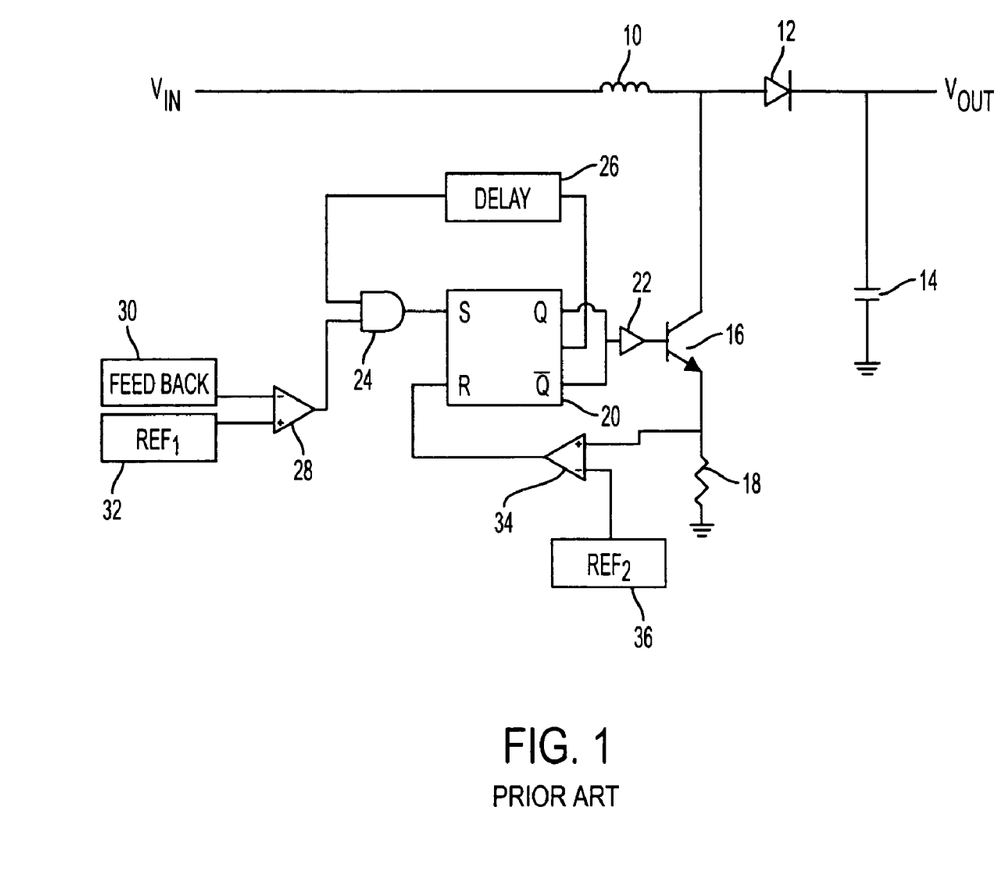
FIG. 1 is a diagram of a known step-up DC/DC converter.

A conventional step-up, or boost, DC/DC converter is illustrated in FIG. 1. Inductor 10 and diode 12 are connected in series between input ($V_{IN}$) and output ($V_{OUT}$) nodes. The input node is typically connected to a DC source, the controlled output node coupled to a load. Capacitor 14 is connected between the output node and ground. Signal responsive switch 16 and resistor 18 are connected in series between the inductor/diode junction and ground. The switch is represented by a transistor having a base connected to the output of latch 20 through switch driver circuit 22. A set terminal of the latch is connected to the output of AND gate 24. Delay circuit 26 has an input connected to the reset output of the latch and an output connected to a first input of the AND gate. A second input of the AND gate is connected to the output of comparator 28. A first input of the comparator receives a feedback signal related to an output parameter. The output parameter may be the voltage at the output, the feedback signal derived through a feedback circuit 30, the feedback appropriately scaled for comparison with a reference voltage $REF_1$ 32 applied to a second input of the comparator. The reset terminal of the latch 20 is connected to the output of a second comparator 34. A first input of comparator 34 is connected to the junction between switch 16 and resistor 18. A second input of comparator 34 is connected to reference voltage circuit 36.

In operation, when switch 16 is in the on, or closed, state, current flows from source $V_{IN}$ through inductor 10 and resistor 18 to ground. Resistor 18 is a sensing element that provides an indication of the current level through the switch when the switch is closed. When the current through the switch increases to the threshold level of reference voltage $REF_2$ 36, comparator 34 outputs a signal to reset the latch 20, thereby turning off switch 16. When the switch is turned off, energy stored in the inductor is transferred to the capacitor 14. Delay circuit 26 ensures that the high latch reset output signal is not applied to the input of AND gate 24 until a minimum time interval has occurred. Turn-on of switch 16 is thus delayed accordingly. Thereafter, the switch will again be turned on when the feedback level exceeds the reference input to comparator 28.

In the particular conventional circuit illustrated, commonly known as a boost regulator, regulated voltage output $V_{OUT}$ has a voltage level higher in magnitude than the voltage input $V_{IN}$ and of the same polarity. Known converters, for example, are Linear Technology LT3463 and LT3464 converters. With appropriate arrangement of inductor, switch and capacitive elements, a regulator output voltage can be provided with a polarity opposite to that of the input voltage or in a buck regulator configuration in which voltage output $V_{OUT}$ has a voltage level lower in magnitude than the voltage input $V_{IN}$.

In many portable systems, when the output load is light, the switching regulators are controlled to go into a power saving sleep mode. In the sleep mode, the regulator reduces the operating current by turning off some internal circuitry and operates intermittently in a burst mode. In a traditional "burst" mode scheme, a hysteretic comparator is used to monitor when the output voltage falls out of regulation in the sleep mode condition. Circuitry is then enabled to deliver the burst current pulses until the output voltage is brought back to within regulation level. Internal circuitry is again turned off in the sleep mode to save power consumption. With light output load, the output voltage then drifts lower to the programmed level at which the regulator "wakes up" to drive the output higher in burst cycles.

Figure 2:
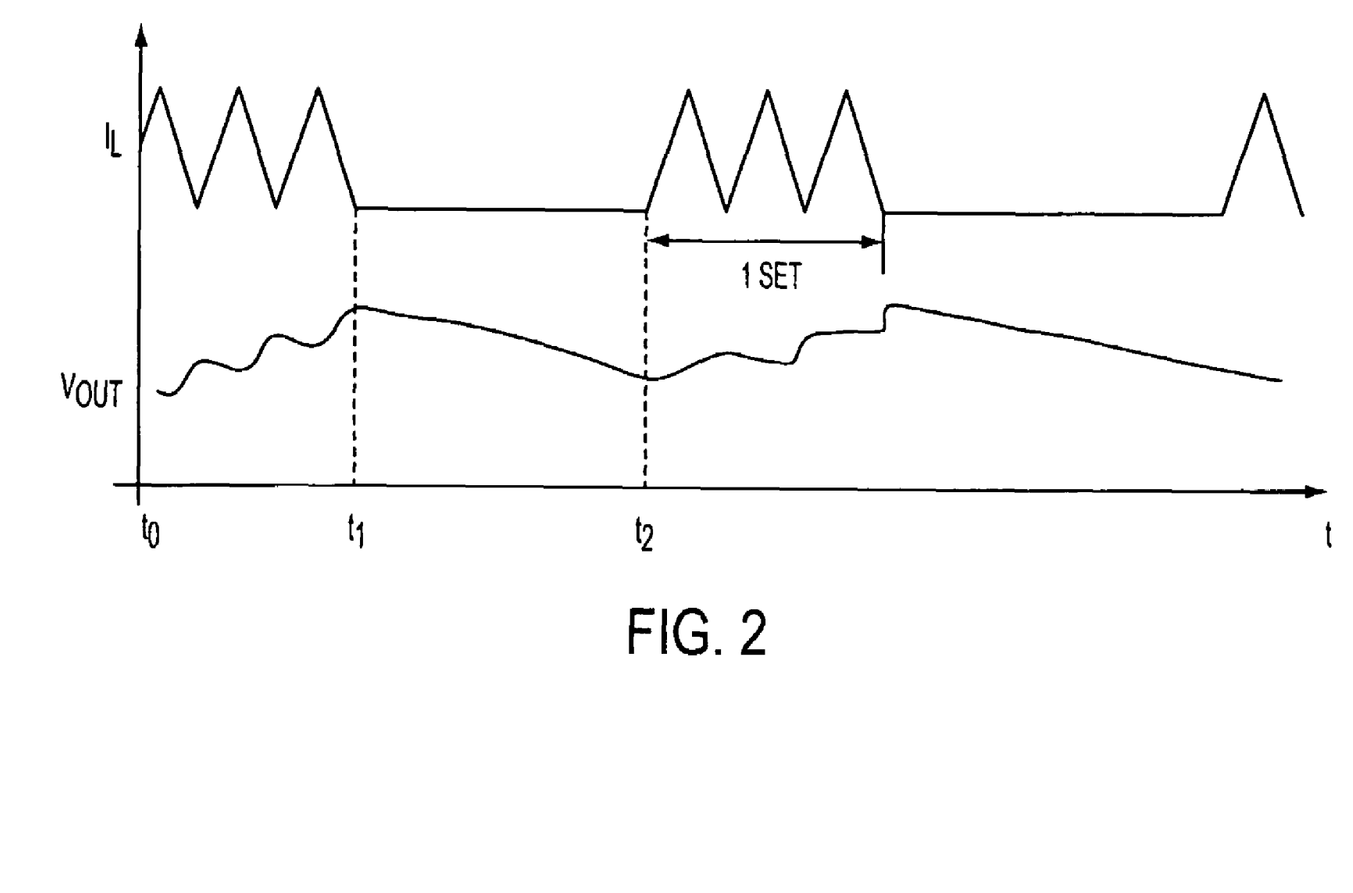
FIG. 2 is a diagram of inductor current and output voltage waveforms for burst mode operation of the converter of FIG. 1.

Inductor current and output voltage waveforms for typical burst/sleep mode operation are illustrated in FIG. 2. At time $t_0$, the output voltage has fallen to a low regulation threshold voltage and a burst cycle has been initiated. The switched current pulses are applied to the output capacitor 14, building up the output voltage until a high regulation threshold voltage is attained at time $t_1$. Switching is then terminated until the output voltage again falls to the low threshold at time $t_2$. Operation continues in this manner during light load conditions. The regulator can wait a relatively long period of time before delivering pulses of energy. While waiting, the regulator enters into a state of low quiescent current and no switching activity, whereby energy is conserved.

The intermittent bursts in the switching waveforms can contain a low frequency content that forms noise in the audio band. A switching regulator operating in burst mode can readily produce switching frequencies below 40 kHz. The audio switching frequency can cause a ceramic capacitor to emit audio waves, which are undesirable to the end user of a system. A prior approach to this problem is the use of a constant frequency, pulse width modulated regulator in which an internal fixed frequency oscillator gates the power switch on each cycle. Such control effects low noise in the audio frequency range. However, the efficiency at light load is poor as the switching frequency remains high during light load conditions.

A need thus exists for a switching regulator that operates at high efficiency over a wide load range, including light load conditions, without having the disadvantage of producing unwanted noise.

DISCLOSURE

The present invention fulfills the above-described needs of the prior art. In a switching regulator, a load condition is sensed. A current threshold level that is variable in accordance with the sensed load condition is set and a time interval that is variable in accordance with the sensed load condition is set. A regulator switch is activated until the switch current attains the set current threshold level and then deactivated. The switch remains deactivated for the set time interval and then reactivated. Activation and deactivation proceeds continuously while the load condition continues to be sensed and the set current threshold and the set time interval are adjusted in accordance with changes in the sensed load condition. The load condition may be load current that is sensed by detecting a voltage proportional to load voltage, the current threshold level being set to a maximum at low load voltage and to a minimum at high load voltage. The time interval is set to a maximum at high load voltage and to a minimum at low load voltage.

A switch control circuit is coupled to a control input of the regulator switch to activate and deactivate the switch. A variable delay circuit is coupled to the load sensor and the switch control circuit, the variable timing circuit configured to set a time interval between successive switch activations based on sensed load condition. A maximum deactivation time interval is set for light load condition. A maximum current setting circuit is coupled to the load sensor and the switch control circuit so that the maximum switch current is varied in accordance with load.

The switch control circuit may comprise a latch having a first output coupled to the control input of the switch and a second output of a state reciprocal to the state of the first output, the second output coupled to an input of the variable delay circuit. The latch is responsive to a pulse applied to a set input to activate the switch and is responsive to a pulse applied to a reset input to deactivate the switch. The output of the variable delay circuit is coupled to the set input.

A switch current sensor is coupled to a positive input of a comparator. A negative input of the comparator is coupled to the set maximum current reference level. The output of the comparator is coupled to the reset input. The comparator applies a pulse to the reset input of the latch to deactivate the switch when the sensed current reaches the maximum current reference level. An error amplifier has a first input for receiving a voltage representing the load condition, for example, a voltage proportional to the load voltage. A second input of the error amplifier is coupled to a preset reference potential. The error amplifier output represents the load condition and is applied to the negative input of the comparator to provide the set maximum current reference level. The error amplifier output may also be coupled through an inverting amplifier to the variable delay circuit.

Thus the regulator switch is continuously and adaptively controlled for successive activation and deactivation over a wide range of load conditions to provide efficient operation over the wide range while preventing the deactivation time of the switch from exceeding a predetermined level. The maximum switch off-time can be limited to a value, for example 25 µsec., so that switching frequency will not fall into the audio band. Traditional burst mode operation has been eliminated.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawing and in which like reference numerals refer to similar elements and in which:

FIG. 4b is a variation of the diagram of FIG. 4a.

FIGS. 5a and 5b are alternative transfer function diagrams for the timing and peak current control circuit of FIG. 4a.

DETAILED DESCRIPTION

Figure 3:
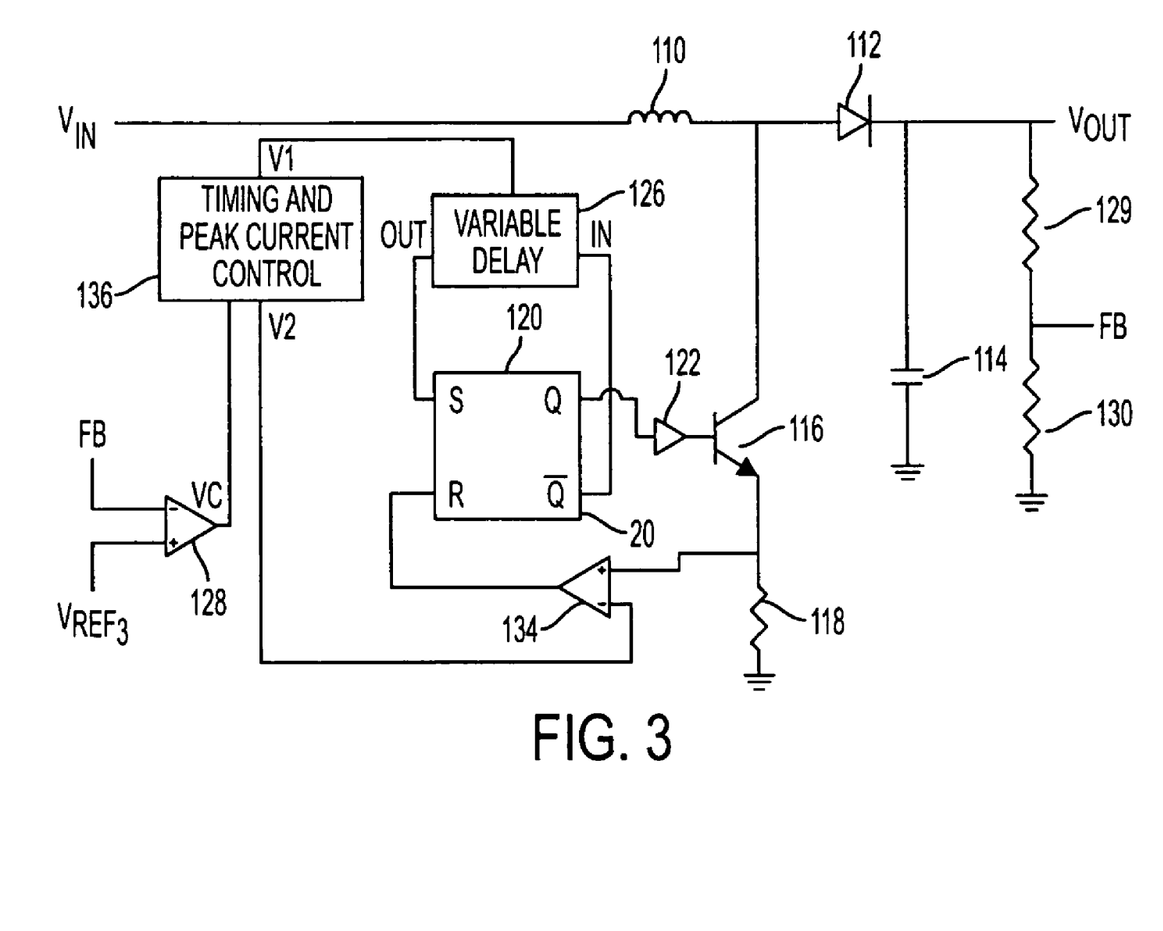
FIG. 3 is a block diagram of a converter in accordance with the present invention.

FIG. 3 is a block diagram of a boost switching regulator in accordance with an embodiment of the present invention. It should be understood that the principles described herein are applicable to boost, buck, and buck-boost current mode switching converters that can provide a regulated output voltage, at either polarity, of any particular desired level from any given DC source. Coupled in series between input node $V_{IN}$ and output node $V_{OUT}$ are inductor 110 and diode 112. Capacitor 114 is connected between the output node and ground. Signal responsive switch 116, shown as a transistor, and sensing resistor 118 are coupled in series between the junction of inductor 110 and diode 112, and ground. Coupled in series between the voltage output node and ground are resistors 129 and 130.

The base of transistor 116 is coupled to the Q output of latch 120 through switch driver circuit 122. Variable delay circuit 126 is coupled between the $\overline{Q}$ output of latch 120 and the set input of the latch. The junction of resistors 129 and 130 represents the output load and is fed back to a negative input of error amplifier 128. The positive input of the error amplifier is supplied by preset reference potential $V_{REF3}$. The output of error amplifier 128 is coupled to timing and peak control circuit 136. Variable delay circuit 126 is coupled to the V1 output of circuit 136. The junction of transistor 116 and resistor 118 is coupled to the positive input of comparator 134. The negative input of comparator 134 is coupled to V2 output of circuit 136.

Transistor 116 is activated to conduct current, applied to inductor 110 by the input voltage source, in response to a pulse applied to the set input of latch 120. A high Q output is applied to the switch driver 122. Switch 116 is deactivated in response to a pulse applied by comparator 134 to the reset input of the latch. A reset pulse is applied when the switch current, sensed by the voltage level at resistor 118 increases to the threshold voltage level of the comparator. The reset pulse changes the states of the Q and $\overline{Q}$ latch outputs. The high level $\overline{Q}$ output is applied by the variable delay circuit 126 to the set input after the set time delay.

The output VC of error amplifier 128 represents load condition. At light load, capacitor 114 is charged to provide a high $V_{OUT}$ voltage level. The output VC of error amplifier, correspondingly, is low. The peak switch current threshold of comparator 134 is set by the V2 output of circuit 136 to a low value. The switch deactivation interval, set by variable delay circuit 126 is at a maximum level, in correspondence with a high V1 output of circuit 136. As load increases, capacitor 114 discharges to lower $V_{OUT}$, and thus the feedback voltage applied to the negative input of error amplifier 128. VC, thus rises accordingly. Circuit 136 is responsive to changes in VC to vary the V1 and V2 outputs. When VC rises, V2 increases to increase the threshold level at the negative input of comparator 134. V1 decreases to shorten the delay set by the variable delay circuit 126. The energy transferred to capacitor 114 is correspondingly increased.

Figure 4A:
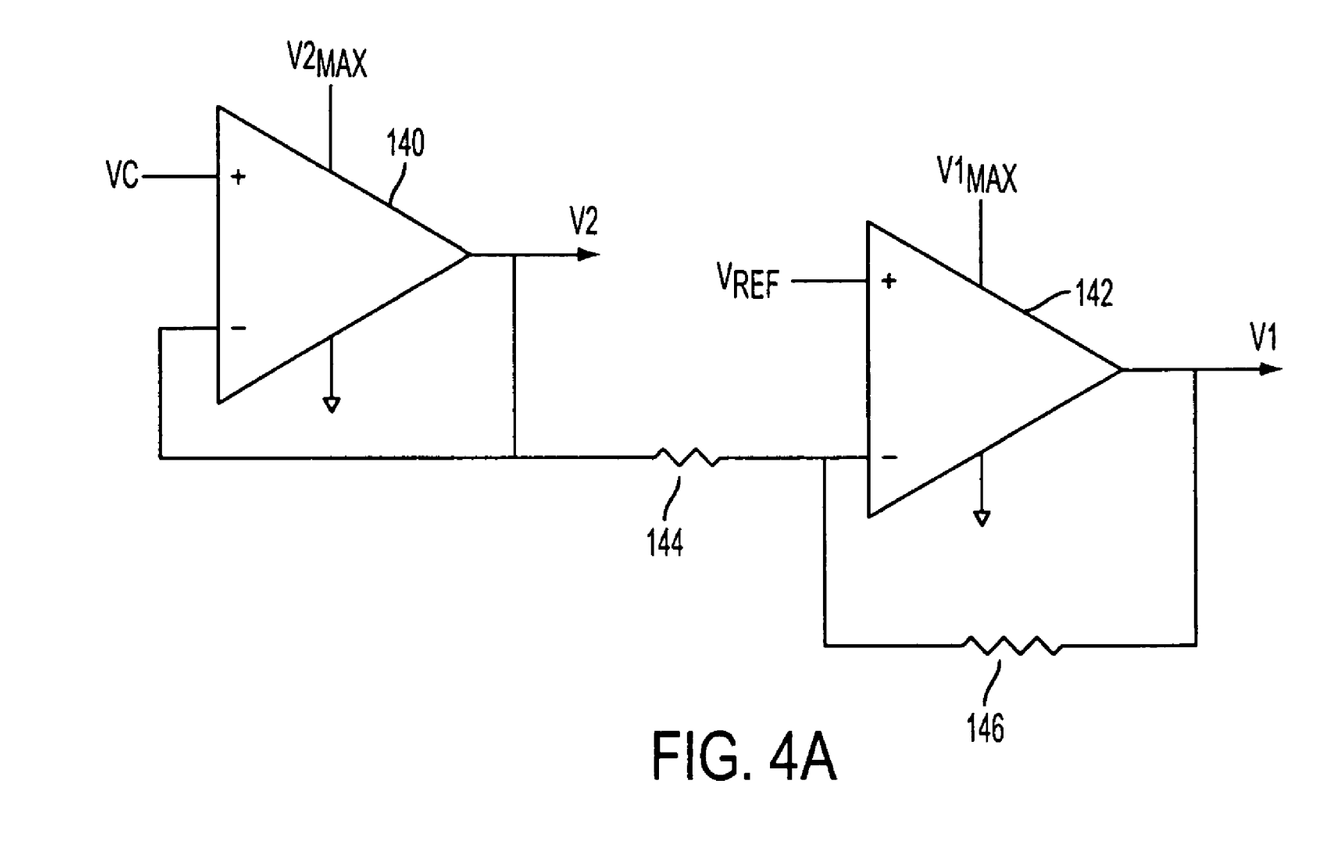
FIG. 4a is a more detailed diagram of a timing and peak current control circuit of FIG. 3.

The timing and peak current control circuit is shown in more detail in FIG. 4a. VC, the output of error amplifier 128, is applied to the positive input of error amplifier 140. Amplifier 140 is configured as an operational amplifier, with its output fed to its negative input. In this configuration, the output V2 will follow the input VC within limits set by bias voltage V2MAX and ground. V2 is applied to the negative input of comparator 134 of FIG. 3. V2 is also applied to negative input of operational amplifier 142 via series resistor 144. The output of amplifier 142 is coupled to its negative input by series resistor 146. A reference voltage $V_{REF}$ is applied to the positive input of amplifier 142. In this configuration, amplifier 142 functions as an inverting amplifier that inversely follows V2 within limits set by bias voltage V1MAX and ground. The V1 output is applied to variable delay circuit 126 of FIG. 3.

Figure 5A:
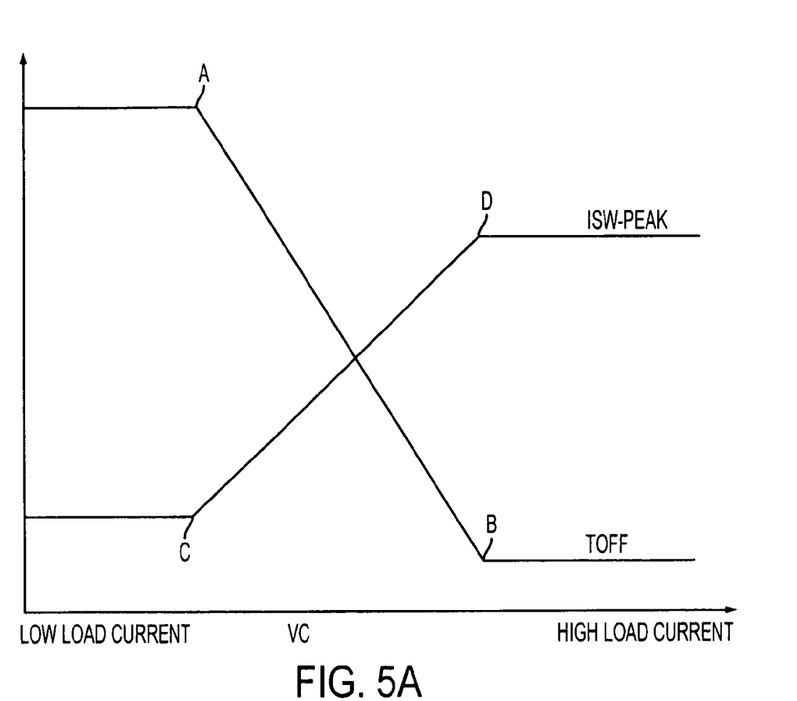
Figure 5B:
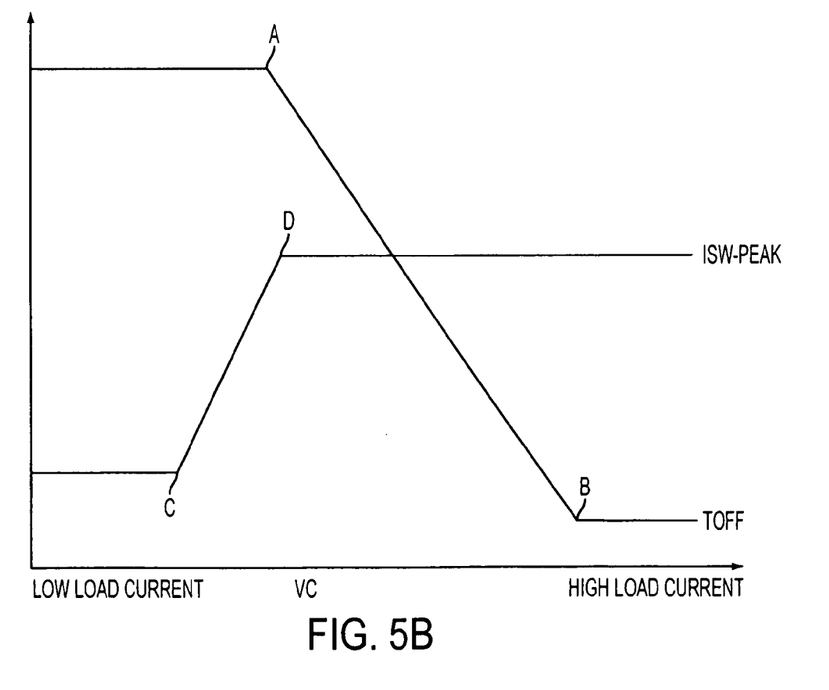

V2MAX, V1MAX, $V_{REF}$, and resistors 144 and 146 can be adjusted to obtain different VC/V1 transfer functions and VC/V2 transfer functions. Two representative transfer function relationships are illustrated in FIGS. 5a and 5b, VC represented by the abscissa. Peak switch current (ISW-PEAK) and switch deactivation interval ($T_{off}$) are shown as a function of VC in each figure. $T_{off}$ is set to a maximum level at light load currents until VC increases to point A. As VC continues to increase, the change in V1 applied to the variable delay circuit 126 produces a corresponding decrease in $T_{off}$ until VC has increased to point B. At point B and thereafter, $T_{off}$ is set to a minimum. ISW-PEAK is set to a minimum level at light loads until VC increases to point C. As VC continues to increase, the change in V2 applied to the threshold input of comparator 134 produces a corresponding increase in ISW-PEAK until VC has increased to point D. At point D and thereafter, ISW-PEAK is set to a maximum.

In FIG. 5a, as example parameters, minimum ISW-PEAK may be set to 40 ma, maximum ISW-PEAK may be set to 200 ma, minimum $T_{off}$ may be set to 300 ns and maximum $T_{off}$ may be set to 15 µs. The break points A and C occur at the same load (VC) and the break points B and D occur at the same load. With this transfer function, the switching frequency will be relatively constant over the load range. In FIG. 5b, minimum ISW-PEAK may be set to 40 ma, maximum ISW-PEAK may be set to 200 ma, minimum $T_{off}$ may be set to 200 ns and maximum $T_{off}$ may be set to 25 µs. The break points A and C do not occur at coincident load levels nor do the break points B and D. With A and D occurring at the same load, efficiency at light load will be higher, although frequency is less constant. The slope of the change of V1 with respect to change of VC is related to the ratio of the values of resistors 144 and 146. Adjustment of these values can be used to change the load break point relationships.

Figure 4B:
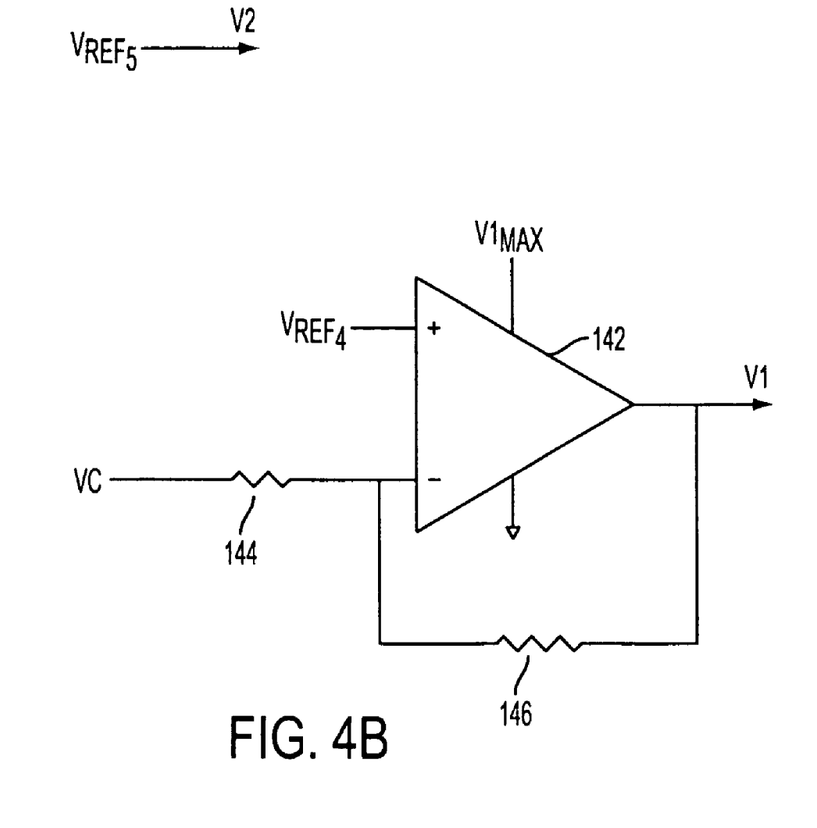

As a further variation, with appropriate control circuit adjustment, ISW-PEAK may be held to a constant level while $T_{off}$ is made to vary inversely with load over a substantial range of load current. FIG. 4b illustrates a variation of the timing and peak current control circuit of FIG. 4a for implementing such functionality. In this circuit, error amplifier 140 has been deleted. V2 is supplied, instead, by a reference voltage $V_{REF5}$. As this reference voltage is applied to the negative input of error amplifier 134 of FIG. 3, the peak current drawn through switch 116 will be constant. The VC signal is applied to the resistor 144, coupled in series with the negative input of error amplifier 142. The values of resistance of resistors 144 and 146 and the voltage values of $V1_{MAX}$ and $V_{REF4}$ can be adjusted to set the maximum and minimum values and the slope and breakpoint values of $T_{off}$ to provide appropriate regulation over the entire load range for a maximum peak current level set by adjustment of the value of $V_{REF5}$.

Figure 6:
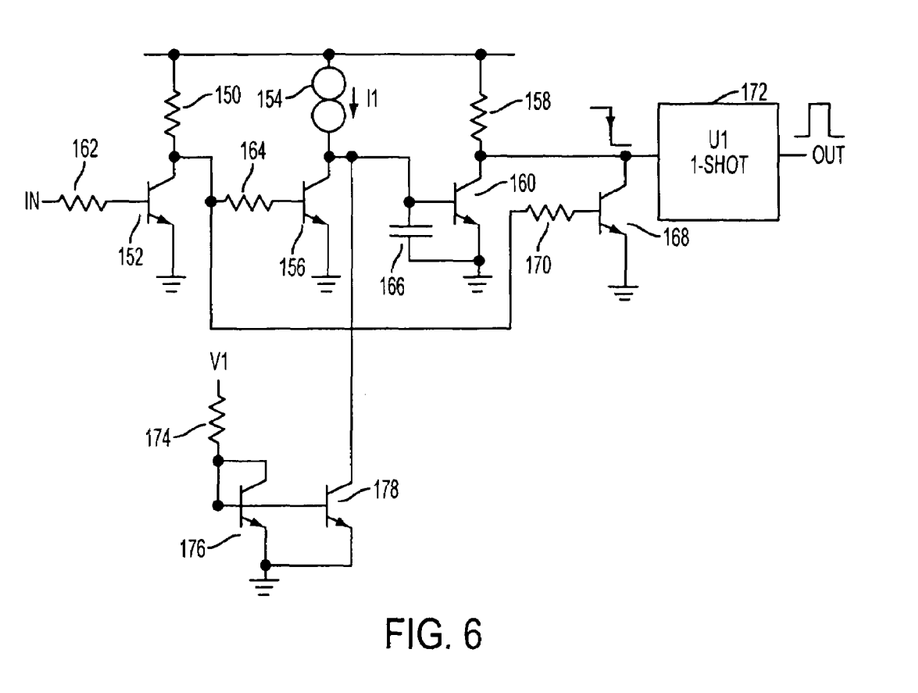
FIG. 6 is a circuit diagram of a variable delay circuit of FIG. 3.

FIG. 6 is a circuit diagram of a variable delay circuit of FIG. 3. Coupled in series between a voltage supply and ground are resistor 150 and transistor 152, current source 154 and transistor 156, and resistor 158 and transistor 160. The base of transistor 152 is coupled to the $\overline{Q}$ output of latch 120, indicated as "IN", via resistor 162. The collector of transistor 152 is coupled to the base of transistor 156 through resistor 164. The collector of transistor 156 is coupled to the base of transistor 160. Capacitor 166 is coupled across the base and emitter of transistor 160. The collector of transistor 160 is coupled to the collector of transistor 168, whose emitter is coupled to ground. The collector of transistor 152 is coupled to the base of transistor 168 via resistor 170.

The collector of transistor 168 is coupled to one-shot 172, which produces an output pulse "OUT" that is applied to the set input of the latch 120. The one-shot is triggered by the negative edge of a pulse at the collector of transistor 168. Coupled in series between the V1 input from circuit 136 and ground are resistor 174 and transistor 176. The collector and base of transistor 176 are coupled together. Transistor 178 is coupled between the base of transistor 160 and ground. The bases of transistors 176 and 178 are coupled together to form a current mirror.

In response to a transition of the "IN" input signal from low to high, a low to high pulse is produced with delay at the "OUT" signal output. Reference is made to the waveforms shown in FIG. 7. At time t0, IN is low. As 152 is rendered non-conductive, the voltage level at its collector and the base of transistor 156 is high. Transistor 156 is conductive, thereby forcing the voltage level at capacitor 166 and the base of transistor 160 to be low, rendering transistor 160 non-conductive. At this time, current source 154 is coupled to ground through transistor 156. Transistor 168 is conductive by virtue of the high voltage level at the collector of transistor 152. The level of the collector of transistor 168 and that of the OUT signal is low.

Figure 7:
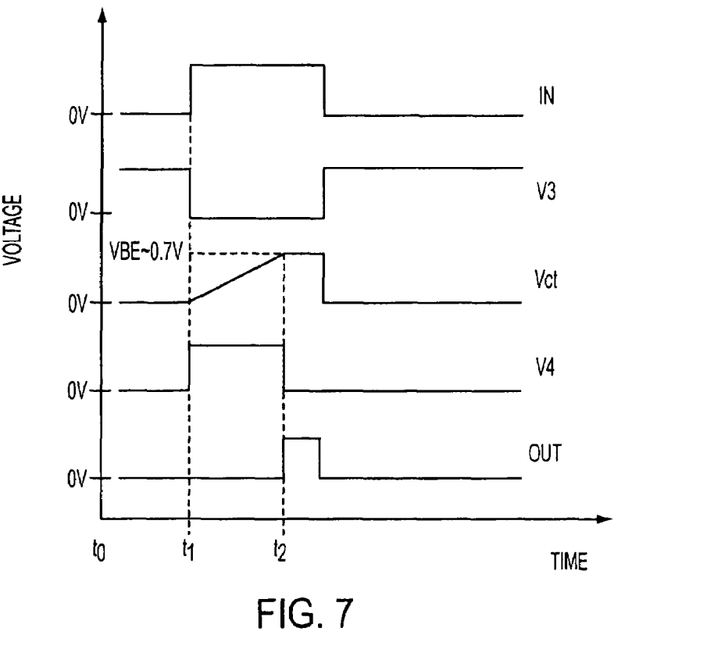
FIG. 7 is a timing diagram for operation of the variable delay circuit of FIG. 5.

At t1, the latch is reset in response to a signal received from comparator 134 to produce a low to high transition at $\overline{Q}$ and IN. Transistor 152 is rendered conductive to force the voltage level at its collector and the base of transistor 156 low. Transistors 156 and 168 are turned off. The collector voltage of transistor 168 goes high. Charge is applied to the capacitor 166 by the current source 154. The capacitor voltage increases at a rate commensurate with its charge rate, which in turn is affected by current mirrored to transistor 178 by the conductive path including transistor 176. Transistor 160 remains non-conductive until the capacitor voltage at its base reaches its trigger level, typically 0.7 v. At t2, transistor 160 is rendered conductive, pulling the voltage level at the collector of transistor 168 low. This high to low transition initiates a one-shot pulse to set the latch 120.

Reactivation of switch 116 has been delayed by the period between t1, the time of the reset pulse IN, and t2. This period is shortened or lengthened in accordance with changes in V1. The current through transistor 178 shunts current of the current source 154 away from application to capacitor 166 by an amount mirrored by transistor 176. An increased current in transistor 178 produces a decrease in the rate at which the capacitor voltage ramps, transistor 160 will be rendered conductive later, and the delay period between t1 and t2 is increased. A decreased current in transistor 178 produces a decreased delay period. The current in transistor 178 mirrors the current in transistor 176, which varies directly with changes in V1. Thus an increase in load produces a decrease in the deactivation period and vice versa.

Figure 8A:
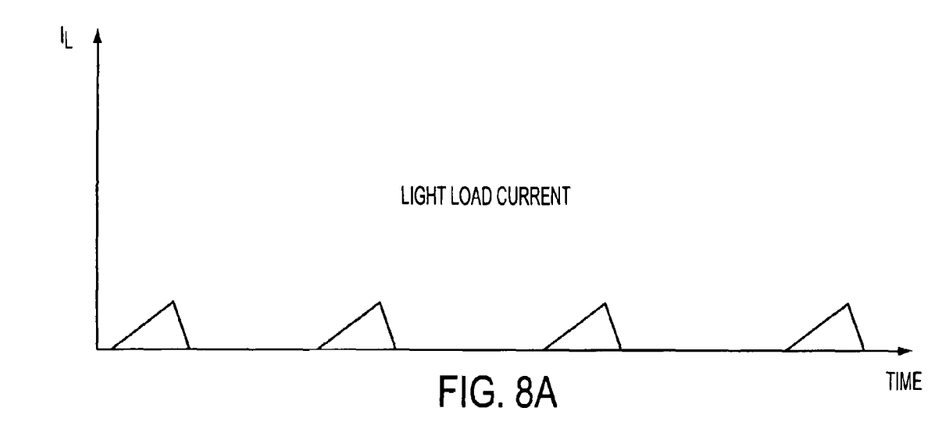
FIGS. 8a and 8b are waveform diagrams of load current for light load and heavy load conditions for operation of the converter of FIG. 3.
Figure 8B:
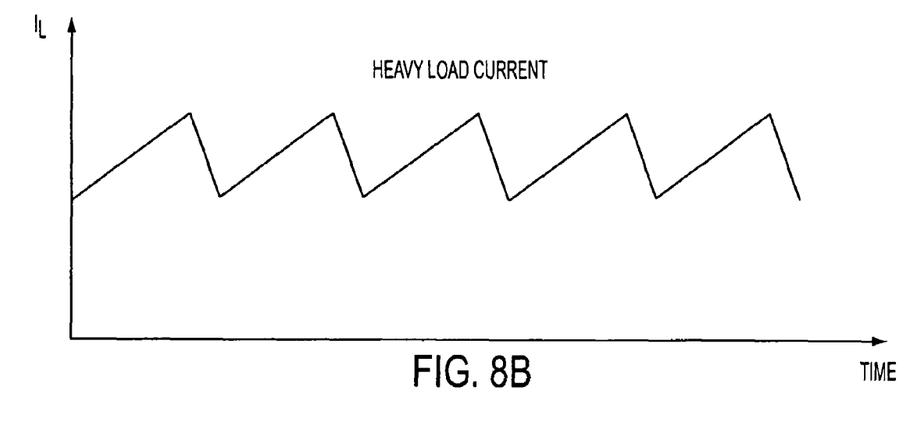

Waveforms of the inductor current $I_L$ for light load current and heavy load current conditions are shown in FIGS. 8a and 8b, respectively. FIG. 8a can be compared with the inductor current waveform for traditional light load burst mode operation, shown in FIG. 2. At a given light load current, triangular shaped current pulses at low peak level are produced with a set maximum period therebetween. The maximum period assures that there will be no audio band interference created. For a heavy load current condition, a higher frequency, continuous current triangular waveform is produced, the peak load current level being significantly higher than that at low load current condition.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. For example, instead of fixing a minimum current level in accordance with load, a minimum switch on time can be set. The concepts expressed herein with respect to the illustrated regulator circuit are equally applicable to other well known regulators configurations.

What is claimed is:

1. A converter circuit connectable to receive a DC voltage at a first voltage level from an input node and to provide an output DC voltage at a second voltage level to a load output node, comprising:
   a controlled switch coupled to the input node and the output node;
   a control circuit configured to set a maximum current reference level for the switch when activated that is variable in accordance with load conditions, and to set a switch deactivation interval between successive switch activations, the switch deactivation interval being variable in accordance with load conditions for varying a switching frequency of the controlled switch in a burst mode operation.

2. A converter circuit as recited in claim 1, wherein the set maximum current level is greatest for high load current condition and least for low load current condition.

3. A converter circuit as recited in claim 1, wherein the set switch deactivation interval is set at a maximum for low load current condition and least for high load current condition.

4. A converter circuit as recited in claim 1, further comprising a current flow path coupling the switch to the input node through an inductor and bypassing the load when the switch is activated.

5. A converter circuit as recited in claim 1, wherein the control circuit comprises:
   an output coupled to a control input of the switch;
   a set input configured to activate the switch;
   a reset input configured to deactivate the switch, thereby initiating the switch deactivation interval; and
   a variable delay circuit having an output coupled to the set input and configured to apply an activation signal thereto at the expiration of the switch deactivation interval.

6. A converter circuit as recited in claim 5, further comprising:
   a current sensor coupled in series with the switch;
   a comparator having a positive input coupled to the current sensor, a negative input coupled to the set maximum current reference level, and an output coupled to the reset input.

7. A converter circuit as recited in claim 6, further comprising:
   an error amplifier having a first input for receiving a voltage proportional to the voltage at the load output node, a second input for receiving a preset reference potential, and an output node representing the load condition, the output node coupled to the negative input of the comparator.

8. A converter circuit as recited in claim 7, further comprising:
   an inverting amplifier coupled between the output node of the error amplifier and the variable delay circuit.

9. A converter circuit as recited in claim 8, wherein the set input and reset input are nodes of a latch, the latch having a first output coupled to the control input of the switch and a second output of a state reciprocal to the state of the first output, and the second output of the latch is coupled to the input of the variable delay circuit input.

10. In a regulator for supplying power to a load, a method comprising the steps of:
    sensing a load condition;
    setting a current threshold level that is variable in accordance with the sensed load condition;
    setting a time interval that is variable in accordance with the sensed load condition;
    coupling a first circuit node of the regulator to a second circuit node;
    decoupling the first circuit node from the second circuit node in response to a current therebetween exceeding the set current threshold level;
    recoupling the first circuit node to the second circuit node at the expiration of the set time interval after the decoupling step, wherein
    the decoupling and recoupling steps are successively repeated in a burst mode operation in accordance with the sensed load condition in which a frequency of decoupling and recoupling the first and second circuit nodes is variable in accordance with the time interval.

11. A method as recited in claim 10, wherein the step of sensing is performed continuously, and the steps of setting the current threshold level and the time interval are responsive to changes in the sensed load condition.

12. A method as recited in claim 10, wherein the sensed load condition is load current and the step of sensing comprises detecting a voltage proportional to load voltage.

13. A method as recited in claim 12, wherein the current threshold level is set to a minimum at high load voltage and to a maximum at low load voltage.

14. A method as recited in claim 12, wherein the time interval is set to a maximum at high load voltage and to a minimum at low load voltage.

15. A method as recited in claim 10, wherein the second circuit node is a power supply terminal.

16. A switching voltage regulator comprising:
    a signal responsive switch;
    a load sensor;
    a switch control circuit coupled to a control input of the switch to activate and deactivate the switch;
    a variable delay circuit coupled to the load sensor and the switch control circuit, the variable delay circuit configured to set a time interval between successive switch activations based on sensed load condition for varying a switching frequency of the switch in a burst mode operation, a maximum deactivation time interval set during light load condition.

17. A regulator as recited in claim 16, further comprising a maximum current setting circuit coupled to the load sensor and the switch control circuit, the maximum current setting circuit configured to vary the maximum switch current in accordance with load.

18. A switching voltage regulator as recited in claim 16, further comprising a constant peak switch current setting circuit coupled to the switch control circuit.

19. A switching voltage regulator as recited in claim 18, wherein the constant peak switch current setting circuit comprises:
a first input coupled to receive a signal related to switch current; a second input coupled to a voltage reference; and an output coupled to the switch control circuit, wherein the maximum switch current level is determined in accordance with the level of the voltage reference.

* * * * *